June 2, 1942. J. W. McGARRY 2,284,754
PLUMBING CONSTRUCTION
Filed Aug. 31, 1940
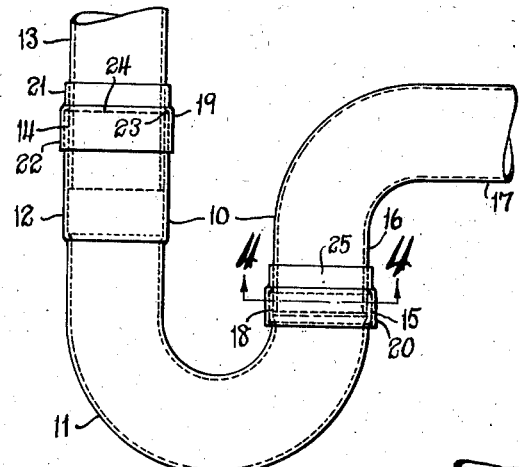
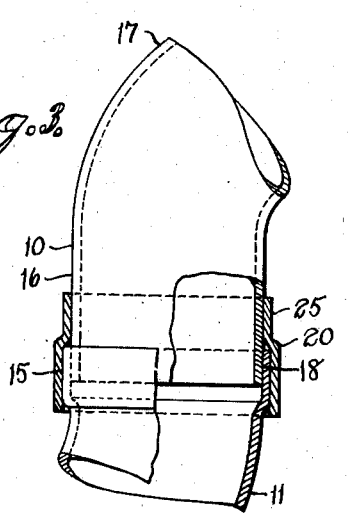
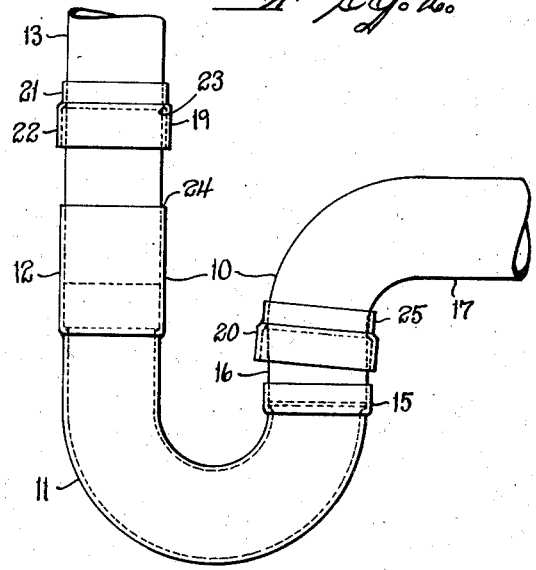
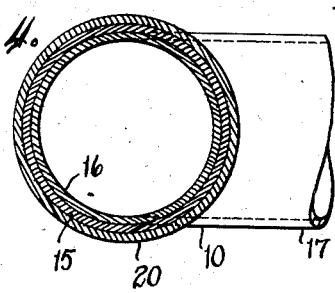
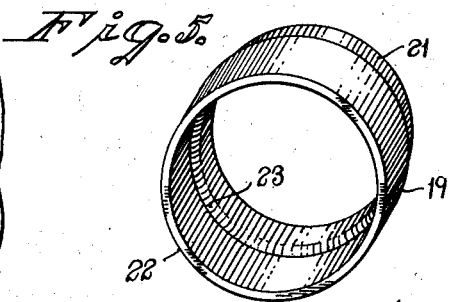
Inventor
James W. McGarry
by Seymour Earle Nichols
Attorneys Patented June 2, 1942

2,284,754

UNITED STATES PATENT OFFICE 2,284,754

PLUMBING CONSTRUCTION

James W. McGarry, Waterbury, Conn., assignor to Chase Brass & Copper Co. Incorporated, Waterbury, Conn., a corporation Application August 31, 1940, Serial No. 354,941

1 Claim. (Cl. 285—115)

This invention relates to improvements in plumbing constructions.

For some years past it has been common to join tubular members, including tubes and pipes, by placing them in telescoped relation and joining the telescoped portions together by sweat-soldering, which provides an effective and low cost mode of connecting tubular members together. During these years, however, it has been necessary to continue to use the more expensive construction employing a screw-threaded nut in connection with a rubber washer or a ground joint in joining tubular members in open plumbing, since it has not been found feasible to use a sweat-soldered construction for joining members where they are exposed to view in open plumbing, inasmuch as the tubular members of such open plumbing are constructed to have a highly-finished condition such as by polished chrome-plating or otherwise to give them an attractive appearance, and to join such members together by sweat-soldering, has heretofore been found to be impractical in view of the damage to the appearance of the open plumbing construction which is viisble to the eye as a result of discoloration at the sweat-joint due to the heat used in making the sweat-soldering operation, or to scraped places having been made by the plumber in preparing the parts to be sweat-joined, or due to the extension or exudation of solder onto portions of one or more of the members beyond the sweat-joint, or to all of these causes. I have devised a way, however, by which these difficulties and drawbacks to a satisfactory appearing sweat-joint connection for open plumbing can be overcome.

It is an object of this invention, therefore, to provide an improved plumbing construction in which two tubular members are in telescoped relation and joined by sweat-soldering, at the same time preventing any of the heretofore-described drawbacks or defects from being visible to the eye.

With the above and other objects in view, as will appear to those skilled in the art from the present disclosure, this invention includes all features in the said disclosure which are novel over the prior art.

In the accompanying drawing forming part of the present disclosure, in which certain ways of carrying out the present invention are shown for illustrative purposes:

Fig. 1 is a side elevation of a plumbing construction made in accordance with this invention;

Fig. 2 is a view similar to Fig. 1 with certain of the parts in disassembled relation;

Fig. 3 is an enlarged side elevation partly in section, of a part of the construction shown in Fig. 1;

Fig. 4 is a horizontal sectional view on line 4—4 of Fig. 1; and

Fig. 5 is a perspective view of my improved shield-member.

In the description and claim, the various parts and steps are identified by specific names for convenience, but they are intended to be as generic in their application as the prior art will permit.

The particular form of plumbing construction illustrated in the drawing for showing the application of my invention, is a P trap 10, including a J bend 11 having a bellmouth inlet-end 12 of substantial length to provide for substantial preliminary telescoping or overlapping adjustment with a tail-piece or pipe or tube 13 of a drain-plug (not shown) prior to the joint being sweat-soldered to form the joint 14. The other end of the J bend 11 has a bellmouth tubular end 15 in telescoped relation with the tubular lower end 16 of a quarter-bend 17, the tubular telescoped ends 15 and 16 providing relative rotational adjustability and a certain degree of longitudinal adjustability before they are sweat-soldered together to form the joint 18.

The telescoped sweat-joints 14 and 18 are shown in Figs. 1 and 3 with the tubular shield-members or dress-caps 19 and 20 in covering position, the shield-member 19 covering the upper end portion of the telescoped ends of the joint 14, while the shield-member 20 covers the full length of the telescoped ends of the joint 18. In Fig. 2 the shield-members 19 and 20 are shown in the positions they occupy prior to and during the sweat-soldering operations upon the connections, the shield-member 19 having a reduced tubular-extension 21 which, either by its size, or distortion to elliptical form before assembly on the tube 13, preferably provides a frictional sliding relation with the tube 13 so that it will readily remain in the raised position shown in Fig. 2 by its frictional engagement with the tube 13, the reduced tubular-extension 21 at its lower end or junction with the larger portion 22 of the shield-member 19 providing an annular shoulder 23 adapted to engage the upper end 24 of the outer tubular telescoped end 12.

The reduced tubular extension 25 of the shield-member 20, is of such size or distorted shape that when, preparatory to performing the sweat-soldering operation on the telescoped ends 15 and 16, the shield 20 is pushed upwardly to a position such, for example, as shown in Fig. 2, it jams and holds itself by friction. After the telescoped ends of the joints have been sweat-soldered, the shield-members 19 and 20 are pushed down into the position shown in Fig. 1.

It will thus be seen that even where the telescoped tubular members to be sweat-soldered are highly finished, such, for example, as being chromium plated or otherwise finished, and even though the telescoped sweat-soldered portions are somewhat discolored, or the adjacent neck-portion of the inner telescoped member has been scraped by the plumber as part of the cleaning operation preparatory to soldering, or excess solder has exuded onto the inner telescoped member to a position beyond the end of the outer telescoped member, the shield-members, when slipped into place, as illustrated in Fig. 1, effectively cover up the surface defects referred to and give a finished satisfactory appearance to the parts, the shield-members ordinarily being chromium plated or otherwise finished to match the type of finish used upon the tubular members which are sweat-joined together.

By the employment of my improved shield-member, as hereinbefore set forth, it is unnecessary to use the previously more expensive screw-threaded nut which threads onto one of the members being joined and serves to compress a rubber washer between end-surfaces of the two members connected by the nut, or the even more expensive form of joint which not only employs the threaded nut but a ground joint connection between the parts instead of employing a rubber washer.

It will be appreciated that the particular types of uses illustrated in the drawing are merely illustrative of two of many in which this invention may be employed, such, for example, as in connection with joints between wastes and overflows for bathtubs.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

I claim:

In combination with a tubular joint in which the ends of two tubular members are in telescoped sweat-soldered relation with one another, and which tubular joint may be of damaged appearance as a result of the soldering operation; an annular shield for covering said tubular joint, said annular shield having two annular portions of different diameters, their junction being an annular shoulder which is adapted to engage against the end portion of the outer one of said tubular telescoped ends, and said two annular portions being adapted to respectively surround and cover adjacent portions of said tubular members, and said annular shield being adapted to be moved from a position beyond the joint in which position the joint is uncovered, axially to a position overlying the joint.

JAMES W. McGARRY.